July 30, 1963 J. HARKINS Re. 25,427

STEEL POWER-CENTER GOLF BALL

Original Filed June 4, 1958

INVENTOR
JACK HARKINS
BY Lamont Johnston
ATTORNEY

United States Patent Office

Re. 25,427
Reissued July 30, 1963

25,427

STEEL POWER-CENTER GOLF BALL

Jack Harkins, Chattanooga, Tenn., assignor to Professional Golf Company, Chattanooga, Tenn., a corporation of Tennessee Original No. 2,914,328, dated Nov. 24, 1959, Ser. No. 739,741, June 4, 1958. Application for reissue Nov. 22, 1961, Ser. No. 155,247
5 Claims. (Cl. 273—230)

Matter enclosed in heavy brackets [ ] appears in the original patent but forms no part of this reissue specification; matter printed in italics indicates the additions made by reissue.

This invention relates to a golf ball and more particularly to a golf ball having a novel type center, designed to give the ball a longer and more stable course in the air and on the ground. This application is a continuation-in-part of my application Serial Number 616,297, filed October 16, 1956, and since abandoned, for a patent on a "Power-Center Golf Ball."

Heretofore, the conventional golf ball [consisted of] *included* a spherical capsule containing liquid forming the core of the ball. The core was encased in a thick-walled solid rubber spherical casing. The rubber casing was then wrapped with rubber thread and encased in a tough outer core of a rubber compound. According to United States Golf Association Rules, the maximum weight of the golf ball is 1.55 ounces and its minimum diameter is 1.68 inches.

*A golf ball according to the invention comprises a relatively small spherical steel core, an uninterrupted homogeneous solid rubber spherical casing of uniform appreciable thickness tightly enclosing the steel core, rubber strands wrapped tightly around the rubber casing, and an outer cover tightly encasing the rubber strands.*

One object of this invention is to provide a golf ball meeting the above requirements and having more accuracy and stability in flight, bounce and roll, and an increased range.

Another object is to provide a golf ball having a reduced tendency to slice or hook.

A further object of this invention is to provide a golf ball which will maintain its spherical shape during use throughout its life and can never be knocked out of round *or deformed*, in contrast with other golf balls heretofore known, which in use are soon knocked out of round.

Still another object is to provide a golf ball having a core approximately four times heavier than the conventional liquid capsule core now in use.

A still further object of this invention is to provide a golf ball having a core consisting of a solid sphere of tempered spring steel.

Figure 1:
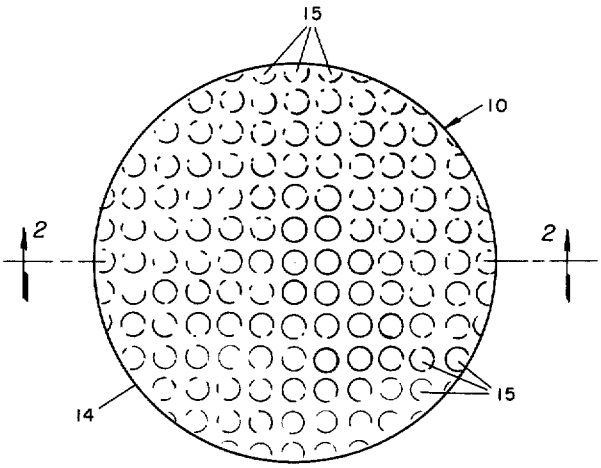
Figure 2:
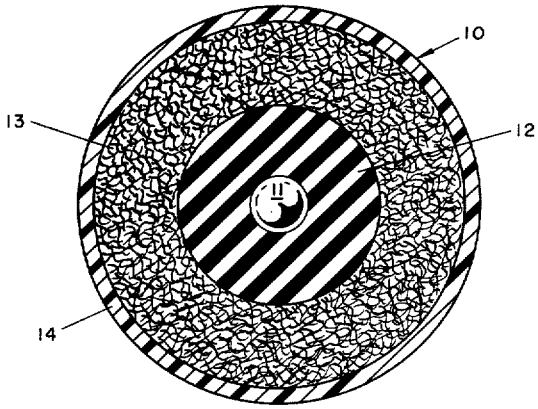

Other objects and advantages of the invention will be apparent from the following description, taken in conjunction with the drawings, in which:

FIG. 1 is a view of the outside of the golf ball made in accordance with this invention; and FIG. 2 is a section taken along the line 2—2 of FIG. 1, with the exception of the spherical core, which is shown solid.

Referring now to the drawings in more detail, the golf ball made in accordance with this invention and generally designated 10, comprises a solid spherical core 11, preferably made of tempered spring steel. This core 11 is approximately ⅜″ in diameter and is about four times heavier than the core, such as a liquid or water capsule, used in conventional golf balls. The core [10] *11* is encased in a solid *relatively dense* rubber spherical center portion of casing 12 *of substantial thickness*. Wrapped around the rubber casing 12 in a manner well-known to the art, are a plurality of strands *or threads* of rubber [thread] 13.

Tightly enclosing the rubber strands 13, also in a manner well-known to the art, is a tough cover 14 of a rubber compound having spaced shallow spherical segment recesses 15. The tempered spring steel core 11, the *firm and compact* rubber casing 12, and the cover 14 are all concentric with each other in order that the centers of gravity of all the parts will coincide with each other at the center of the ball 10.

Because the solid tempered spring steel spherical core 11 gives the golf ball 10 a center which is heavier, with concentrated weight, more compact and more resilient than any other golf ball heretofore known, the ball is capable of a longer and truer flight and more accuracy on the greens. *The solid unsoft rubber casing 12 about the core 11 is capable of resisting forces tending to deform it and holds the core firmly in position against the impact of a golf club on the cover 14, the core being held immovably in its central position during impact of the golf club and thereafter by the rubber thread wrapping 13 and the solid rubber casing 12.* The increased weight of the ball 10 reduces the chance of deviation in flight caused by wind and other forces acting on the ball, such as those forces caused by slicing and hooking. Also when the ball 10 has reached the end of its flight, the novel tempered spring steel center 11 causes the ball to bounce and to roll farther and straighter than a golf ball having a core or center formed from a liquid capsule. The novel tempered spring steel core 11 gives the ball 10 the ability to resist compression more effectively and prevents the ball from being knocked out of round during its life, while still retaining resilience or a "live" feel, in contrast with other golf balls now or previously used, which in use are soon knocked out of round.

It is contemplated that the use of a golf ball such as that made in accordance with this invention will improve and make more interesting the game of golf by enlivening and speeding up the pace of the game. The golf ball which is capable of longer and more stable flight will make the game more enjoyable and aid the morale of the player. Because of the improvement in range and stability and the reduction of hooking and slicing of the novel power-center golf ball 10, an unnecessary amount of time will not be wasted in trying to find lost balls; the movement of players on a crowded course will be accelerated; and the number of strokes and errors committed by those not so skilled in the game and by those who play the game occasionally for enjoyment will be reduced.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A golf ball comprising a spherical tempered spring steel core, a solid rubber spherical casing tightly enclosing said steel core, rubber threads wrapped tightly around said rubber casing and an outer cover tightly encasing said rubber threads.

2. A golf ball comprising a spherical tempered spring steel core, a solid rubber spherical casing tightly enclosing said steel core, rubber strands wrapped tightly around said rubber casing and an outer cover tightly encasing said rubber strands.

*3. A golf ball comprising a solid spherical steel core, a solid relatively dense rubber spherical casing of uniform thickness tightly gripping the said steel core throughout its extent, rubber threads wrapped tightly around said rubber casing, and an outer cover tightly encasing said rubber threads.*

*4. A golf ball comprising a relatively small solid spherical steel core, a solid firm and compact rubber spherical*

*casing of uniform appreciable thickness tightly gripping said steel core throughout its extent, rubber strands wrapped tightly around said rubber casing, and an outer cover tightly encasing said rubber strands.*

*5. A golf ball comprising a relatively small spherical steel core, an uninterrupted homogeneous solid rubber spherical casing of uniform appreciable thickness capable of resisting forces tending to deform it tightly gripping said steel core throughout its extent, rubber threads*

*wrapped tightly around said rubber casing and an outer cover tightly encasing said rubber threads.*

References Cited in the file of this patent or the original patent

UNITED STATES PATENTS

| | | |
|---|---|---|
| 1,255,388 | Cobb | Feb. 5, 1918 |
| 1,946,378 | Young | Feb. 6, 1934 |
| 2,609,201 | Martin | Sept. 2, 1952 |